June 10, 1969   J. P. STAPLES   3,449,635
TRANSMITTER OVERLOAD PROTECTION CIRCUIT
Filed Aug. 21, 1967

INVENTOR.
JOHN P. STAPLES
BY
H. H. Loscke
Attorney

United States Patent Office 3,449,635
Patented June 10, 1969

3,449,635
TRANSMITTER OVERLOAD PROTECTION CIRCUIT
John P. Staples, China Lake, Calif., assignor to the United States of America as represented by the Secretary of the Navy
Filed Aug. 21, 1967, Ser. No. 662,210
Int. Cl. H02h 3/08, 7/20
U.S. Cl. 317—31        5 Claims

ABSTRACT OF THE DISCLOSURE

An overload protection and charge level regulation circuit for a solid state magnetic modulator of a radar transmitter in which a toroidal inductance operating near saturation has a first winding utilized in place of the ordinary charging choke in the modulator charging loop. A second winding of the toroidal inductance is coupled in series circuit with a resistance and a silicon controlled rectifier (SCR) which, in turn, is controlled by a voltage sensing circuit coupled in parallel with the modulator pulse storage capacitance. In normal operation, the voltage sensing circuit triggers the SCR-second winding circuit at a predetermined voltage level late in the capacitance charging cycle in order to prevent overcharging the capacitance; however, a short or open in the transmitter load will cause the SCR to be triggered much earlier in the charging cycle causing the inductance to saturate, breaking down a Zener diode-resistance circuit which is in series with the storage capacitance in the charging loop, to produce a pulse which may be utilized to control a charging source disconnect circuit that removes the direct current (D.C.) potential source from the charging loop, thereby shutting off the transmitter. A short in the charging loop itself will cause the Zener diode network to produce a similar disconnect pulse to protect the modulator and transmitter circuitry.

Background of the invention

This invention is in the field of electrical regulation and overload protection circuitry, and more specifically in the area of automatic protection circuitry for the pulse modulator and magnetron sections of a radar transmitter.

As indicated in my United States patent application entitled "Solid State Magnetron Modulator Mismatch Protective Circuit," Ser. No. 577,784, filed Sept. 7, 1966, now Patent No. 3,405,321, and also assigned to the Government of the United States, various forms of protection circuits for pulse modulators are known. Such known circuits include those which sense power supply current overshoot, or missing pulses. Such protection circuits may disconnect the power supply from the modulator, disconnect the modulator from the load, or provide some other means of disabling the moduliator. Often these sensing devices act in conjunction with one or more thermal relays to interrupt various circuits after a series of faults have occurred. Sensing devices of this type are often located in the pulse load or pulse forming network (PFN) circuitry following the modulator where the pulses are of high voltage amplitude, thereby increasing the maintenance and reliability problems. Also, it is often necessary for circuits of this type to separately sense conditions such as pulse overshoot, missing pulses, and impedance mismatch between the modulator and the following pulse load circuitry, which further complicates the circuitry requirements.

The invention described in my above-referenced United States patent application entitled "Solid State Magnetron Modulator Mismatch Protective Circuit" overcomes many of the difficulties inherent in protection circuits of the prior art by providing a solid state regulation and protection circuit in which the sensing of faults is carried out within the relatively low voltage modulator stage, pulse overshoot is automatically held to a minimum, and the power supply is cut off from the modulator whenever impedance mismatch between the modulator and its pulse load causes the modulator charging current flow to exceed a predetermined amount. However, in certain applications it has been found to be desirable to provide a transmitter overload protection circuit having all of these features and, in addition, being even more reliable and fast acting than that disclosed in my above-referenced United States patent application. The present invention satisfies this need for increased reliability and rapid action.

Summary of the invention

The present invention provides a reliable and fast acting, solid state overload protection and charge level regulation circuit for a pulse modulator of a radar transmitter wherein the charging loop for the modulator pulse storage capacitance includes a toroidal coil inductance operating near saturation having a first winding thereon utilized as the charging choke. A second winding of the toroid is coupled in series circuit with a resistance and a silicon controlled rectifier (SCR), to ground potential. The SCR is controlled by a charge level voltage sensing circuit which is coupled in parallel with the modulator pulse storage capacitance. Under normal operating conditions, i.e., with no shorts, opens, or other undesirable causes of severe impedance mismatch existing in the pulse load circuitry, the modulator pulse storage capacitance will reach its desired level of charge late in its charging cycle, at which time the voltage sensing circuit senses that the capacitance is charged to its desired level by comparing its voltage level with a predetermined reference voltage and pulses the SCR into conduction, closing the loop containing the toroid second winding and effectively shunting the charging current through the second winding-SCR-resistance loop to ground potential, thereby preventing overcharge of the storage capacitance and causing it to be maintained at the desired level of charge, until discharged through the pulse load by a pulse repetition frequency (PRF) signal applied to the capacitance discharge circuit. Under normal conditions, the charging current shunted through the second winding loop late in the charging cycle is of nominal value and does not cause the toroid to saturate; the charging current is merely shunted away from the storage capacitance, thereby regulating its level of charge.

A first control resistance is coupled in series with the storage capacitance in the charging loop, and a Zener diode in series with a second resistance is coupled in parallel with the first control resistance. Under normal conditions, when the storage capacitance is being charged a voltage appears across the first control resistance, which voltage is considerably below the breakdown voltage of the Zener diode. However, if a short occurs in the charging loop, the voltage drop across the first control resistance will suddenly exceed the Zener diode breakdown voltage causing the Zener diode to break down and produce a pulse at its anode electrode which is utilized to initiate operation of a charging source disconnect circuit which interrupts the shorted charging loop by removing the D.C. potential charging source therefrom.

If a severe impedance mismatch such as a short or open occurs in the pulse load (transmitter) circuitry following the modulator, it will prevent the pulse storage capacitance from completely discharging during its discharge cycle, thereby causing it to reach the desired charge level much earlier in the following charging cycle.

This condition will be sensed by the voltage sensing circuit which will pulse the SCR in the second winding loop early in the following charge cycle. This causes the charging current, which early in the charge cycle is at a relatively large value, to be shunted through the second winding. This high level of shunted current in the second winding of the toroid causes the toroid to saturate. When the toroid saturates, a large peak current is caused to flow through the first control resistance in the charging loop, producing a voltage drop thereacross which exceeds the breakdown voltage of the Zener diode causing it to break down, which produces a pulse at its anode electrode. This pulse is utilized to control the charging source disconnect circuit to protect the modulator and transmitter circuitry by removing the D.C. potential charging source from the modulator circuit. Thus it is a general object of the present invention to provide a solid state transmitter overload protection circuit for the pulse modulator and transmitter sections of a radar system, which will control the charge level of the pulse storage means in the modulator, and also rapidly and reliably protect the modulator and transmitter sections from overloads.

Brief description of the drawing

Other objects and the attendant advantages, features, and uses will become more apparent to those skilled in the art as the description proceeds when considered with the accompanying drawing wherein like reference numerals designate like or corresponding parts throughout the figures thereof, and in which.

Description of the preferred embodiment

Figure 1:
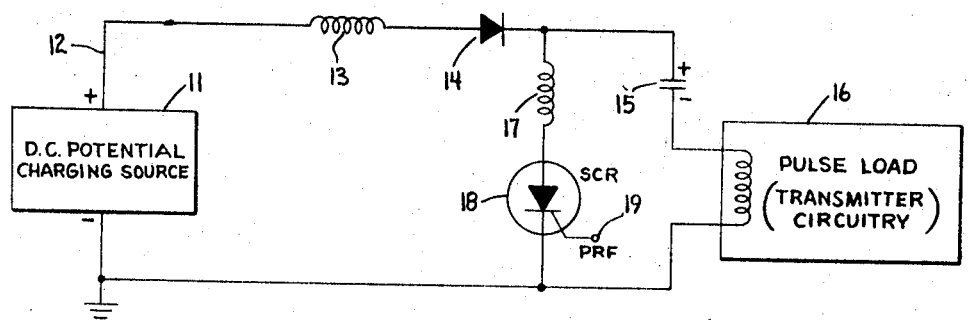
FIGURE 1 is a block-schematic diagram representing a simplified unprotected modulator circuit of the prior art for providing pulses to a pulse load such as a radar transmitter circuit.

Referring more particularly to FIGURE 1, there is shown, in block-schematic form, a simplified modular circuit in which a D.C. potential charging source 11 has its negative terminal coupled to ground potential and its positive terminal coupled via a conductor 12 to one terminal of an inductance 13 which acts as a charging choke. The other terminal of inductance 13 is coupled via a "locking" diode 14 to one plate of a modulator pulse storage capacitance 15, the other plate being coupled, via the primary winding of a load coupling transformer in a suitable pulse load 16, to ground potential. Locking diode 14 prevents the charge stored by potential source 11 on capacitance 15 from discharging back through the charging inductance 13. A holdoff inductance 17 is coupled n series with an SCR 18 across storage capacitance 15. Inductance 17 and SCR 18 form a circuit for controlling the discharge of capacitance 15 through pulse load 16. Assuming capacitance 15 to be charged to the desired level, a discharge control pulse in the form of a PRF signal is applied to the control electrode 19 of SCR 18 from another section of the radar in order to establish the desired frequency of discharge of capacitance 15, thereby establishing the PRF of the pulse load transmitter 16. When a PRF pulse is applied to control electrode 19, SCR 18 is turned on and the voltage across it goes toward zero causing holdoff inductance 17 to saturate and allow current flow therethrough to resonantly discharge storage capacitance 15, allowing the energy stored in capacitance 15 to be transferred via the coupling transformer to pulse load 16. After capacitance 15 is discharged, SCR 18 turns off and capacitance 15 begins to charge again.

Figure 2:
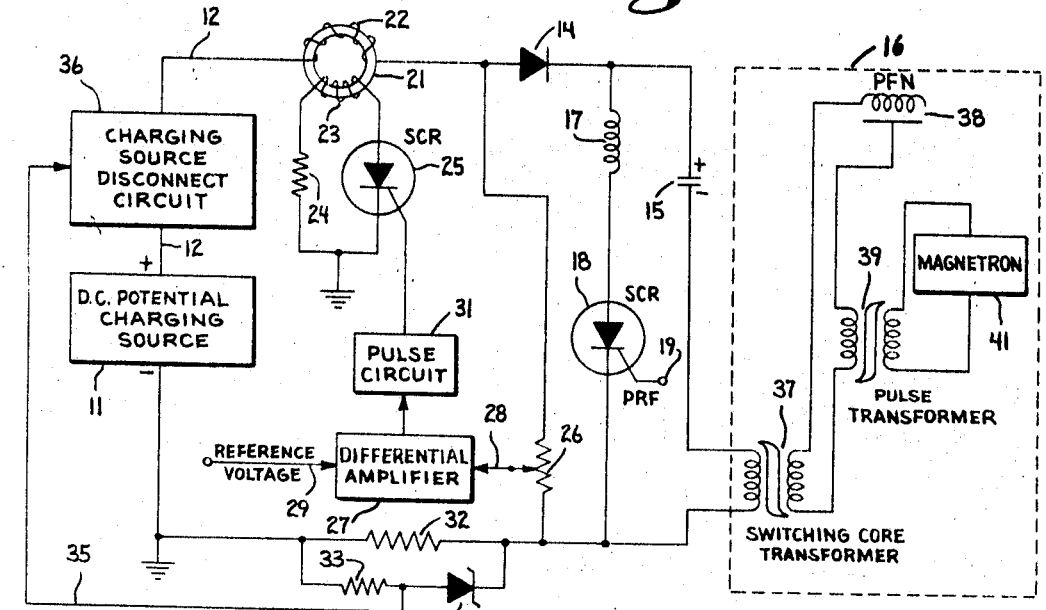
FIGURE 2 represents a block-schematic diagram showing the modulator circuit of FIGURE 1 modified to utilize the overload protection and regulation circuitry of the present invention.

With reference now to FIGURE 2, there is shown the basic modulator circuit of FIGURE 1, with the addition of the overload protection and regulation circuitry of the present invention. Inductive charging choke 13 of FIGURE 1 has been replaced by a first winding 22 of a "soft knee" powdered iron toroidal inductance 21. Winding 22 has a sufficient number of turns to cause inductance 21 to operate near saturation. A second winding 23 has one end terminal coupled via a resistance 24 to ground potential, and the other end terminal coupled via an SCR 25 to ground potential. A voltage level sensing circuit is comprised of a potentiometer 26 coupled across storage capacitance 15, a differential amplifier 27 having a first input 28 coupled to potentiometer 26 for receiving a voltage therefrom proportional to the charge level of capacitance 15, and a second input 29 coupled to a reference voltage proportional to the level to which it is desired to charge capacitance 15, and a pulse circuit 31 having its input terminal coupled to the output terminal of differential amplifier 27 for receiving a control voltage therefrom whenever the voltage applied to amplifier terminal 28 representing the charge level of capacitance 15 exceeds the reference voltage applied to terminal 29, and its output terminal coupled to the control electrode of SCR 25 for providing a turn-on control pulse thereto in response to the control voltage from differential amplifier 27. A first control resistance 32 is inserted in series in the charging loop between storage capacitance 15 and charging source 11, and the series combination of a resistance 33 and a Zener diode 34 is coupled in parallel with resistance 32. The anode electrode of Zener diode 34 is coupled via a conductor 35 to a charging source disconnect circuit 36, which upon receiving a pulse from Zener diode 34 disconnects charging source 11 from the remainder of the charging loop circuit, thereby protecting the modulator and following circuitry from overload conditions. Block 16 represents a typical pulse load transmitter circuit, including a switching core transformer 37 for coupling the capacitance discharge pulse to a PFN 38 and a pulse transformer 39 for coupling the driving pulse from the PFN to a magnetron 41. Charging source disconnect circuit 36 may be of any suitable type such as that employing a relay which must be manually reset in order to return charging source 11 to the charging loop after it has been removed because of an overload, or where it is possible that the fault may be a temporary one, it may be desirable to utilize an automatic recycling disconnect circuit which will automatically return charging source 11 to the charging loop after a predetermined lapse of time. One embodiment of an automatic recycling circuit of this type is shown in FIGURE 3.

Figure 3:
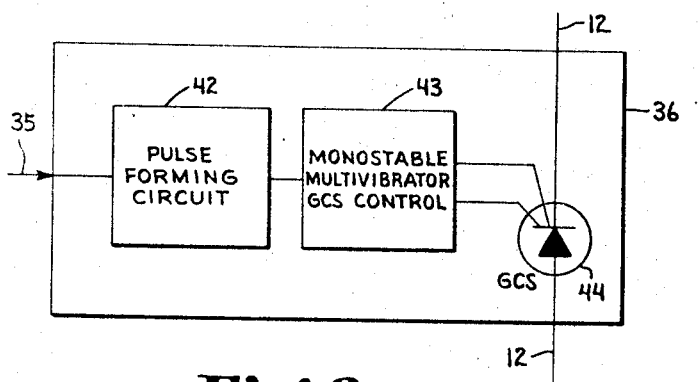
FIGURE 3 illustrates a block-schematic diagram of an embodiment of a solid state charging source disconnect circuit which may be utilized as block 36 of FIGURE 2.

Referring now to FIGURE 3, there is shown in block-schematic form an automatic recycling charging source disconnect circuit suitable for use as block 36 of FIGURE 2. Conductor 35 from Zener diode 34 is coupled to the input means of a pulse forming circuit 42, which has its output means coupled to the input control terminal of a monostable multivibrator (MV) 43 which acts as the control means for a solid state gate controlled switch (GCS) 44. Charging source 11 is coupled via conductor 12 to the anode electrode of GCS 44, and winding 22 of toroidal inductance 21 is coupled via continued conductor 12 to the cathode electrode of GCS 44. Thus it may be seen that when GCS 44 is turned on, charging source 11 will be coupled to the charging loop; and when GCS 44 is turned off, source 11 will be removed from the loop. The GCS 44 may be of any suitable type, several of which are commercially available from Westinghouse Electric Corporation and others. A GCS is quite simliar to an SCR in that it is turned on by a positive signal on a first control electrode, however, it differs from an SCR in that it may be turned off again by a negative signal on a second control electrode. So long as monostable MV 43 is in its stable state, it applies a positive signal to a first control electrode causing GCS 44 to remain in a turned-on condition, which couples charging source 11 to the charging loop. When the invention senses an overload and produces a control disconnect pulse on conductor 35, that pulse is applied to pulse forming circuit 42 where it is shaped into a suitable trigger pulse for multivibrator 43, which is then triggered into its unstable state causing a negative control signal to be applied to a second control electrode of GCS 44, thereby turning it off and disconnecting charging source 11 from the charging loop. The length of time which charging source 11 remains disconnected is equal to the length of time in which MV 43 remains in its unstable state, which is determined by the adjustable time constant of MV 43. When MV 43 automatically returns to its stable state, GCS 44 will again be turned on, recoupling charging source 11 to the charging loop. If the cause of the previous overload is no longer present, the modulator will again function in a normal manner. If the overload condition still exists, the invention will again cause an overload pulse to be produced on conductor 35, resulting in MV 43 again turning off GCS 44 for a length of time equal to the adjustable time constant of the multivibrator. This type of recycling disconnect circuit has been found to be desirable in missile applications, where use of a manually resettable form of disconnect circuit would not be practical.

Operation

For purpose of explanation of the operation of the overload protection and regulation circuitry of this invention, it will be initially assumed that normal operating conditions exist, i.e., there are no shorts, opens, or other causes of severe impedance mismatch existing either in the pulse load circuitry (block 16 of FIGURES 1 and 2) or in the modulator itself, and that capacitance 15 is being charged to the desired predetermined voltage level by charging source 11 through charging choke winding 22 of toroidal inductance, which causes a relatively small current flow through resistance 32. Storage capacitance 15 will reach its desired level of charge (approximately twice the voltage level of charging source 11) late in its charging cycle, at which time differential amplifier 27 will sense via potentiometer 26 that the desired level has been reached and supply a potential to pulse circuit 31 causing it to pulse SCR 25, turning it on and closing the circuit comprised of second winding 23 of toroidal inductance 21, resistance 24, and SCR 25. When SCR 25 turns on, the charging current in charging choke winding 22 is effectively shunted through winding 23 and away from capacitance 15, causing it to remain at the desired level of charge until discharged through pulse load 16 by a PRF signal applied to control electrode 19 of SCR 18. Under such normal operating conditions the current shunted through winding 23 late in the charging cycle is of nominal value and does not cause toroid 21 to saturate. Also, the relatively small current flow through control resistance 32 which occurs during the charging of capacitance 15 produces a voltage drop across resistance 32 which is below the breakdown voltage of Zener diode 34, thus no disconnect pulse will be presented to conductor 35 during normal operation.

In the event of a short circuit in the modulator charging loop itself, the current flow through control resistance 32 will immediately greatly increase causing the voltage drop thereacross to suddenly exceed the breakdown voltage of Zener diode 34 causing it to break down, thereby producing an overload control pulse at its anode electrode which is coupled via conductor 35 to disconnect circuit 36. Disconnect circuit 36, in response thereto, removes charging source 11 from the modulator circuit, thereby rapidly and reliably protecting the modulator charging circuit and pulse load 16 from overload damage due to a short circuit within the charging loop itself.

The occurrence of a severe impedance mismatch between the modulator and the pulse load circuitry 16, such as a short or open in load circuit 16, will prevent pulse storage capacitance 15 from completely discharging through load 16 during its discharge cycle. Thus capacitance 15 will retain a considerable portion of its charge during the first discharge cycle following the occurrence of the mismatch; and accordingly, during the subsequent charge cycle capacitance 15 will reach the desired charge level at a much earlier conduction angle. This condition will be sensed by differential amplifier 27 which will cause pulse circuit 31 to turn on SCR 25, closing the second winding 23 circuit much earlier than during the normal charging cycle. This causes the charging current, which at this point in the charging cycle is at a relatively high value, to be effectively shunted through the second winding 23 closed loop circuit. In contrast to normal regulation operation, this high level of shunted current flowing in second winding 23 of toroid 21 causes the toroid to saturate. When toroid 21 saturates, indicating a severe impedance mismatch between the modulator and pulse load 16, a large peak current is caused to flow through control resistance 32, producing a voltage drop thereacross which exceeds the breakdown voltage of Zener diode 34. Zener diode 34 then breaks down, producing an overload control pulse at its anode electrode which is coupled via conductor 35 to charging source disconnect circuit 36. In response to this overload control pulse on conductor 35, disconnect circuit 36 removes charging source 11 from the modulator circuit by breaking the charging loop circuit between source 11 and charging choke winding 22. The modulator charging circuit and pulse load 16 are thus rapidly, reliably, and effectively protected from overload damage due to a severe impedance mismatch between the modulator and pulse load 16.

The invention described herein may be manufactured and used by or for the Government of the United States of America for governmental purposes without the payment of any royalties thereon or therefor.

I claim:

1. An overload protection circuit for a pulse modulator having a pulse storage capacitance coupled in series with a diode rectifier and an inductive charging choke across a source of charging potential for producing a charge upon said capacitance, and having discharge control means coupled across said capacitance for controlling the discharge thereof into a suitable pulse load, comprising:

a toroidal inductance means operating near saturation, having as a first winding said inductive charging choke, and having a second winding thereon;

a solid state switch means coupled in series with a resistance across the end terminals of said second winding of said toroidal inductance means forming a closed loop therewith, said switch means having a control electrode for controlling the conduction therethrough;

voltage sensing and control means having input means coupled across said pulse storage capacitance for sensing the level of charge stored thereon, and having output means coupled to said control electrode of said solid state switch means for supplying a turn-on pulse thereto whenever the level of charge stored on said pulse storage capacitance tends to exceed a predetermined maximum level;

overload sensing and control means coupled in series with said capacitance, between said capacitance and said source of charging potential for sensing current flow therethrough and producing a control signal at an output means whenever said current flow therethrough exceeds a predetermined minimum level; and charging source disconnect means coupled in series between said source of charging potential and said inductive charging choke, and having input means coupled to said output means of said overload sensing and control means for receiving a control signal therefrom and disconnecting said source of charging potential from the modulator charging circuit in response thereto.

2. An overload protection circuit for a pulse modulator having a pulse storage capacitance coupled in series with a diode rectifier and an inductive charging choke across a source of charging potential for producing a charge upon said capacitance, and having discharge control means coupled across said capacitance for controlling the discharge thereof into a suitable pulse load, as set forth in claim 1 wherein said solid state switch means is a silicon controlled rectifier having its anode electrode coupled to one end terminal of said second winding of said toroidal inductance and having its cathode electrode coupled in series with said resistance to the other end terminal thereof.

3. An overload protection circuit for a pulse modulator having a pulse storage capacitance coupled in series with a diode rectifier and an inductive charging choke across a source of charging potential for producing a charge upon said capacitance, and having discharge control means coupled across said capacitance for controlling the discharge thereof into a suitable pulse load, as set forth in claim 2 wherein said voltage sensing and control means comprises:
 a differential amplifier, which compares a predetermined reference voltage level with the voltage level received from said input means, and produces a control voltage whenever the voltage level at said input means exceeds said predetermined reference voltage level; and
 a pulse circuit coupled to said differential amplifier for receiving said control voltage therefrom, and coupled to the control electrode of said silicon controlled rectifier for providing said turn-on pulse thereto in response to said control voltage.

4. An overload protection circuit for a pulse modulator having a pulse storage capacitance coupled in series with a diode rectifier and an inductive charging choke across a source of charging potential for producing a charge upon said capacitance, and having discharge control means coupled across said capacitance for controlling the discharge thereof into a suitable pulse load, as set forth in claim 3 wherein said overload sensing and control means comprises:
 a first control resistance;
 a Zener diode coupled in series combination with a second control resistance, said series combination being coupled in parallel with said first control resistance and said Zener diode being polarized in a direction such that it opposes the normal flow of charging current, and having output means coupled from the junction of said Zener diode and said second control resistance to said charging source disconnect means for providing said control signal thereto.

5. An overload protection circuit for a pulse modulator having a pulse storage capacitance coupled in series with a diode rectifier and an inductive charging choke across a source of charging potential for producing a charge upon said capacitance, and having discharge control means coupled across said capacitance for controlling the discharge thereof into a suitable pulse load, as set forth in claim 4 wherein said charging source disconnect means comprises:
 a pulse forming circuit having input means for coupling to said output means of said overload sensing and control means to receive said control signal therefrom, and having output means for providing thereat a multivibrator trigger signal in response to said control signal;
 a monostable multivibrator having input means coupled to said output means of said pulse forming circuit for receiving said trigger signal, having an adjustable time constant, and having a first output means for providing a positive signal thereat when said multivibrator is in its stable state and a second output means for providing a negative signal thereat when said multivibrator is triggered into its unstable state; and
 a solid state gate controlled switch, being coupled in series between said source of charging potential and said inductive charging choke and being polarized in the direction of charging current flow, having a first control electrode coupled to said first output means of said multivibrator for receiving turn-on signals therefrom, and having a second control electrode coupled to said second output means of said multivibrator for receiving turnoff signals therefrom.

References Cited

UNITED STATES PATENTS

| 2,438,962 | 4/1948 | Burlingame et al. | 328—9 |
| 2,764,684 | 9/1956 | Mayer | 331—62 |
| 2,815,445 | 12/1957 | Young et al. | 317—51 X |
| 3,277,342 | 10/1966 | Ross | 317—51 X |
| 3,405,321 | 10/1968 | Staples | 331—62 X |

JOHN F. COUCH, *Primary Examiner.*

J. D. TRAMMELL, *Assistant Examiner.*

U.S. Cl. X.R.

317—33, 51; 331—62